United States Patent [19]

Spann

[11] 4,454,462
[45] Jun. 12, 1984

[54] POWER FACTOR MOTOR CONTROLLER

[75] Inventor: Robert J. Spann, Euless, Tex.

[73] Assignee: Neha International, Dallas, Tex.

[21] Appl. No.: 487,353

[22] Filed: Apr. 25, 1983

Related U.S. Application Data

[63] Continuation of Ser. No. 198,763, Oct. 20, 1980, abandoned.

[51] Int. Cl.$^3$ ............................................. H02P 7/36
[52] U.S. Cl. .................................. 318/729; 318/798; 318/805; 318/438
[58] Field of Search ............... 318/727, 729, 732, 778, 318/798, 799, 805, 806, 807, 809, 438

[56] References Cited

U.S. PATENT DOCUMENTS

| | | | |
|---|---|---|---|
| 4,052,648 | 10/1977 | Nola | 318/805 |
| 4,070,605 | 1/1978 | Hoeppner | 318/809 X |
| 4,266,177 | 5/1981 | Nola | 318/799 |
| 4,286,303 | 8/1981 | Genheimer et al. | 318/798 X |
| 4,290,001 | 9/1981 | Espelage | 318/805 X |
| 4,297,628 | 10/1981 | Hedges | 318/778 X |
| 4,322,672 | 3/1982 | Walker | 318/805 X |

OTHER PUBLICATIONS

Intel Publication by Alex Toth, May, 1980, "Energy Savings in an Induction Motor Using the 8022μ".
McGraw-Hill-Dictionary of Scientific and Technical Terms, 1976, p. 1534.

Primary Examiner—B. Dobeck
Assistant Examiner—Richard M. Moore
Attorney, Agent, or Firm—Dennis T. Griggs

[57] ABSTRACT

The power factor for an AC induction motor (34) is controlled by selectively controlling the firing angle delay of a gate signal to a gate controlled power switch (36) during the cycle of the power source (32). Source voltage zero crossing (66) is sensed and a plurality of consecutively sequenced discreet windows (94, 96, 98, 100) are initiated. If the current zero crossing (68) occurs in the first window (94), then a sudden load on the motor (34) is indicated, and any delay in the firing angle of the power switch (36) is substantially eliminated. This enables conduction of the power switch (36) during substantially the entire cycle of the source voltage (60), thus providing instantaneous full power to the motor (34). If the current zero crossing (68) occurs in the second window (96), then the power factor is too great, and more power is needed at the motor (34). The gate firing angle is reduced, whereby the power switch (36) will conduct for a longer cycle portion and hence deliver more power to the motor (34). If the current zero crossing (68) occurs in the third window (98), then an optimum power factor is indicated and the gate firing angle is not affected. If current zero crossing (68) does not occur in any of the first (94), second (96) or third (98) windows, then it will occur somewhere in the fourth window (100) and too much power is getting to the motor (34). Upon termination of the third window (98) without zero crossing (68) of the current, the gate firing angle delay is increased so that the power switch (36) will be ON for a shorter portion of the cycle, and hence less power is delivered to the motor (34).

43 Claims, 3 Drawing Figures

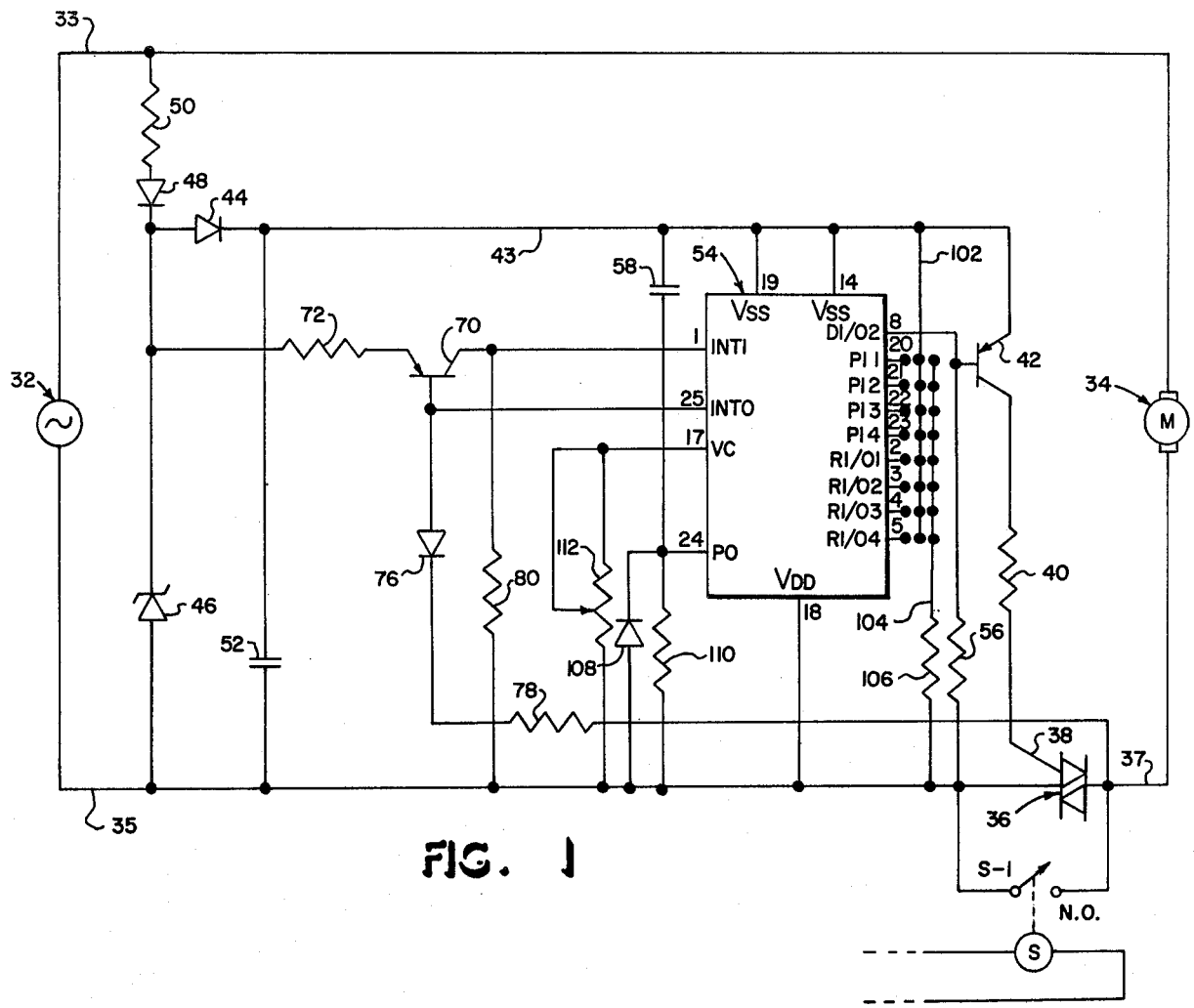
FIG. 1
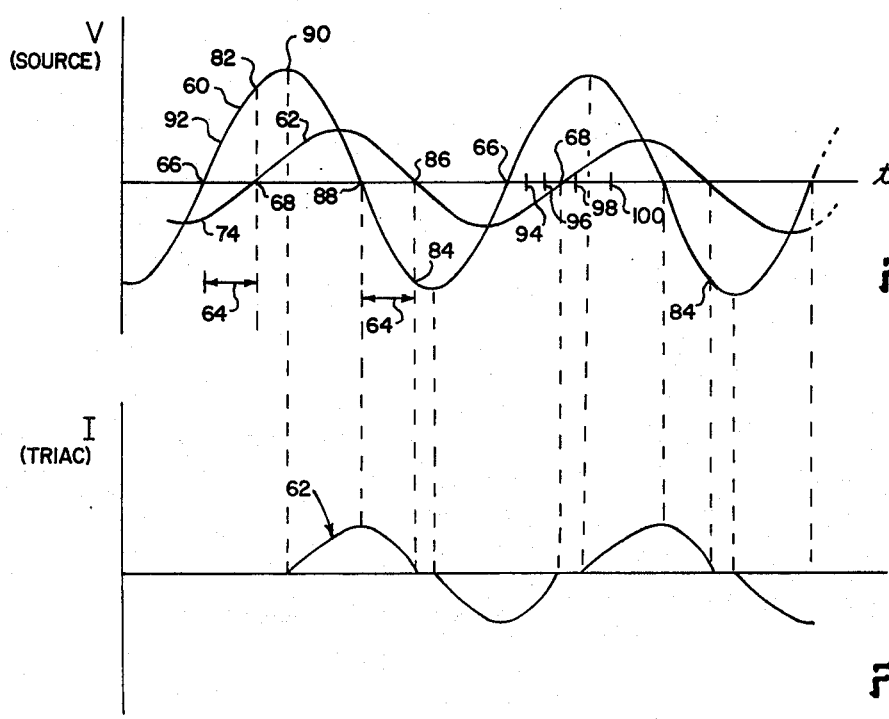
FIG. 2
FIG. 3

POWER FACTOR MOTOR CONTROLLER

This application is a continuation of application Ser. No. 198,763, filed Oct. 20, 1980 now abandoned.

BACKGROUND OF THE INVENTION

1. Field of the Invention

The invention relates to power input controls for AC induction motors, and more particularly to a control circuit for providing variable input power in accordance with loading on the motor.

2. Description of the Prior Art

AC induction motors are well known and widely used. These types of motors run at substantially constant speeds independent of load and applied voltage. The most efficient operation results when the applied voltage is a function of the load, since the motor draws substantially the same current whether loaded or unloaded.

Electrical power is wasted when the motor is partially loaded or is unloaded because relatively large currents flow and little work is performed. IR losses occur in the distribution system, including the motor windings, even though no mechanical power is delivered.

Motor control systems are known which reduce power losses by sensing the phase lag between voltage and current. The control system forces the motor to run at a constant predetermined power factor regardless of load or line voltage variations, within the limits of the motor.

An example of a control system is shown in Nola U.S. Pat. No. 4,052,648, and NASA Tech. Brief, MFF-23280, summer 1977. Voltage is varied by a selectively triggered power switch. A phase control and firing angle circuit is provided, including a ramp voltage wave form synchronized with the zero crossings of the sinusoidal load voltage, a DC error signal, and a train of pulses that become wider as the error signal increases. The error signal is derived from a voltage/current phase lag sensing circuit which produces a DC voltage proportional to the phase lag. Since the current remains high in an unloaded motor, the phase angle between voltage and current shifts with load. Typically, the current may lag the voltage by 80° in an unloaded motor and by only 30° when loaded. The produced DC voltage proportional to phase lag is summed with a fixed reference voltage which is indicative of a desired phase angle. The difference of these two is the error signal which biases the ramp voltage which is in synchronization with the line voltage. The intersection of the ramp and error voltages are detected by a squaring amplifier whose output provides the timing for turning on the power switch. The ON time of the power switch thus varies with the load. This in turn varies the voltage applied to the motor, to force the phase angle to remain at the commanded value. The phase angle is measured by detecting the time between the zero crossings of the voltage and the zero value of the trailing edge of the current.

While prior power factor controllers have been useful for their intended purposes, the present invention relates to improvements thereover.

SUMMARY OF THE INVENTION

The present invention provides power factor control by sensing the voltage/current phase lag in accordance with a set of consecutively sequenced time periods or windows which determine the firing angle of a gated semiconductor switch in circuit with an AC induction motor. Upon zero crossing of the line voltage, the sequence of windows is initiated, during one of which occurs zero crossing of the current.

In preferred form, the sequence of windows comprises fist, second and third fixed delay windows followed by a fourth window. A power switch semiconductor switch is used, and turn-off thereof corresponds to zero crossing of the current. The status of the power switch tested at the end of each fixed window to determine if there has been a zero crossing of the current.

Upon crossing of a predetermined level by the line voltage, the first window is initiated and lasts a predetermined time. At the end of this first window, the status of the power switch is tested. If the power switch has already turned off (zero crossing of the current has occurred), a sudden load on the motor is indicated. The firing angle delay of the gate signal to the power switch is then reduced to zero. This provides instantaneous full power in a sudden load situation.

If the current has not crossed zero during the first window (the power switch has not yet turned off when tested at the end of the first window), then the second window is initiated and lasts a predetermined time. After this second window has elapsed, the status of the power switch is tested. If the power switch has turned off, then the current has crossed zero in the second window. This indicates that the power factor is slightly above a desired level, and that more power is needed at the motor. The firing angle delay of the gate signal to the power switch is then slightly decreased so that the power switch will be fired slightly earlier in the next cycle to thus give more power to the motor.

If the current has not crossed zero during the first and second windows, then a short third delay window is initiated and lasts a predetermined time. After this third window has elapsed, the status of the power switch is tested. If the power switch has turned off, then the current has crossed zero during the third window. This indicates that there is a desired amount of phase lag between current and voltage, and that the power factor is at an optimum level. The firing angle delay of the gate signal to the power switch is then left unchanged so that the triac will again be fired at the same point in the next cycle to thus maintain the optimum power factor for the motor.

All three windows will be sequenced regardless of time of current zero crossing. At the end of the windows, the firing angle delay is initiated at the end of which the power switch is fired. During the sequencing of the windows, a status register is set according to the window during which zero crossing occurs. Later after time delay is completed and power switch fired, the time delay is modified according to the contents of the status register.

If zero crossing (current) does not occur by the end of the third window, then it is assumd that it will occur later and the system is getting too much power.

If the current has not crossed zero during the first, second and third windows (the power switch has still not turned off when tested at the end of the third window), then a fourth window is initiated. Zero crossing of the current will ocur somewhere in the fourth window. Initiation of the fourth window indicates that the power factor is below a desired level and that too much power is getting to the motor. Initiation of the fourth window causes the firing angle delay in the gate signal to the power switch to be increased so that the power switch will be fired later in the next cycle. This reduces the power delivered to the motor.

The fourth window controls a variable time period, the length of which affects the timing of the gate signal to the power switch in the next cycle. The firing angle time delay of the gate signal to the triac is incremented each cycle in which the fourth window is initiated. This incrementation is cumulatively repeated for each successive cycle until the test of the status of the power switch at the end of the third window indicates that the triac has turned off, i.e. the current has crossed zero during the third window.

In the preferred embodiment, a microcomputer is used to set the fixed delay windows, the incrementation of the firing angle time delay of the gate signal to the triac in order to deliver less power to the motor, for decrementation of the firing angle time delay of the gate signal to the power switch in order to deliver more power to the motor. Further, the microcomputer senses a reference level crossing of the line voltage, the status of the power switch, and times the firing angle delay.

BRIEF DESCRIPTION OF THE DRAWINGS

FIG. 1 is a circuit diagram of the preferred embodiment of a power factor controller constructed in accordance with the invention.

FIG. 2 is a wave form diagram illustrating aspects of operation of the invention.

FIG. 3 is a wave form diagram illustrating aspects of operation of the invention.

DETAILED DESCRIPTION OF THE PREFERRED EMBODIMENT

There is shown in FIG. 1 a power factor controller 30 connected between an AC power source 32 and an AC induction motor 34. Source 32 has a frequency from 50 to 60 hertz, and produces a sinusoidal voltage across conductors 33 and 35. A power switch 36 is connected in series with the motor through conductor 37 for controlling energization of the motor. Connected in parallel with the power switch 36 is a normally open contactor switch S-1 which by-passes triac 36 during starting. Contactor switch S-1 is actuated by a solenoid S to conduct in-rush current during starting of the motor 34. Operation of the solenoid S is controlled by the microcomputer 54.

The power switch is fired into a conductive ON state at gate 38 by signal current through resistor 40 in response to conduction of transistor 42. Emitter current for transistor 42 is delivered through conductor 43 from the cathode of diode 44 or capacitor 52. Current to the anode of diode 44 is delivered from conductor 33 through diode 48 and resistor 50. Zener 46 provides voltage regulation. Resistor 50 provides current limiting. A capacitor 52 is connected between conductor 43 and conductor 35. This capacitor stores current during the positive half-cycle of the line voltage, i.e., when conductor 33 is high and conductor 35 is low, for use during the negative half-cycle and for use when current requirements exceed the charging ability of resistor 50.

Transistor 42 is biased into conduction by a gate signal from a microcomputer 52. To facilitate understanding, the drawing shows a microcomputer 54 with standard pin numbers and port designations assigned thereto. The base of transistor 42 is connected to pin 8. A resistor 56 is connected between the transistor base and conductor 35. Pins 14 and 19 are connected to conductor 43. A capacitor 58 is connected between pin 24 and conductor 43.

Transistor 42 is turned on and off by microcomputer 54 through pin DI02. Pin DI02 either pulls the base of transistor 42 to Vss or allows it to float. If the base of transistor 42 is pulled to Vss, the transistor is turned off and no current flows through the collector to the gate 38 of the power switch. The triac will not turn on so long as transistor 42 is off. If the base of transistor 42 is allowed to float then resistor 56 will cause current to flow in the base of the transistor, turning the transistor on and pulling its collector to a voltage approaching Vss. Resistor 40 will then limit the amount of current which will flow to the gate 38 of the power switch.

A transistor 70 has a collector connected to pin 1 of the microcomputer. Transistor 70 has an emitter connected through resistor 72 to a point between diode 48 and zener 46. The base of transistor 70 is connected to pin 25 of the microcomputer. When the positive half-cycle of the line voltage begins, the emitter of transistor 70 is pulled quickly to a voltage approximating Vss at pins 19 and 14. Regardless of whether triac 36 is ON or OFF, the INTO port at pin 25 will be pulled high through the base-emitter of transistor 70. This provides the signal that the positive half-cycle has begun.

Diodes 44 and 48 allow current to pass through to charge capacitor 52 so long as the AC input voltage is sufficiently positive and so long as the breakdown voltage of zener 46 is not exceeded. Diode 48 prevents power dissipation in resistor 50 during the negative half cycle and diode 44 prevents current from flowing from capacitor 52 through resistor 72 to the emitter of transistor 70. The emitter of transistor 70 must be held high (almost at Vss) only during the positive half cycle and gives the computer an indication of the state of the AC power input. Without diode 44, the emitter of transistor 70 would be high regardless of the condition of the AC power. Without diodes 44 and 48, there would be no coverage charge to capacitor 52. Diodes 44 and 48 prevent discharge through resistor 50 during the negative half-cycle.

FIG. 2 shows sinusoidal line voltage 60 from source 32. Current 62 lags by a phase angle 64 measured between voltage zero crossing 66 and current zero crossing 68. The positive half-cycle begins at point 66 as the line voltage passes through zero, from negative to positive. The pulling of pin 25 high through the base-emitter of transistor 70 indicates that such positive half-cycle has begun.

If triac 36 is ON at the beginning of the positive half-cycle, as seen by the current flow at 74, FIG. 2, the power switch will remain ON until the current through inductive motor 34 reaches zero. The time 64 which elapses between the zero crossing of the voltage and the zero crossing of the current is related to the power factor at which the motor is operating.

The base of transistor 70 is connected through a diode 76 and resistor 78 to conductor 37. When the power switch turns off, the voltage on the resistor 78 will rapidly, almost instantaneously, rise to the line voltage on conductor 33. This reverse biases diode 76 which in turn eliminates base current for transistor 70, so that the INT1 port at pin 1 will now be pulled low. This provides the current zero crossing signal. A resistor 80 is connected between the collector of transistor 70 and conductor 35.

Resistor 72 provides a necessary voltage drop when transistor 70 is turned on. Without resistor 72, pin 1 (INT1) of the computer 54 would be pulled significantly more positive than Vss. This would exceed the maximum operating conditions specified for microcomputer 54.

As the AC power enters the positive half cycle, the power switch is on and will remain on until the magnitude of the current in the motor decreases to zero. The side of resistor 78 which is connected to the power switch will thus be held at or near the ground (VDD, or neutral) voltage. Consequently when, as we enter the positive half cycle, the emitter (and base) of transistor 70 are pulled toward and approach Vss, current will begin to flow through diode 76 and resistor 78 turning on transistor 70. When the current in the motor decreases to zero, power switch 36 will turn off, causing connection 37 suddenly to become quite positive. When this happens, diode 76 will be reverse biased and transistor 70 will turn off. At this time, the INT1 input to the computer 54 will be pulled low by resistor 80 giving the computer an indication that the power switch has turned off.

Referring to FIG. 2, phase angle 64 shows an optimum power factor phase lag. During each positive and negative half-cycle of the line voltage 60, power switch 36 is fired at symmetrical points such as 82 and 84 during the increasing line voltage of the respective polarity. For example, the firing of the power switch at point 82 in the rising line voltage 60 initiates positive current flow through the power switch. This current flow terminates at positive to negative current zero crossing 86. This current zero crossing 86 lags the positive to negative voltage zero crossing 88 by optimum phase angle 64.

There is no limitation that the power switch will only be fired during the increasing line voltage. In many instances where small amounts of power are needed, the power switch will be fired while the magnitude of the voltage is decreasing.

If the phase lag increases, the load on the motor has been reduced, whereby less power is needed at the motor. Power to the motor can be reduced by firing the power switch at a later time in the half cycle, such as at 90. The power switch will thus conduct for a shorter portion of the half-cycle, whereby less power is applied to the motor.

If the phase lag decreases, the load on the motor has been increased, whereby more power is needed at the motor. Power to the motor can be increased by firing the power switch at an earlier time in the half-cycle, such as at 92. The triac will thus conduct for a longer portion of the half-cycle, whereby more power is applied to the motor.

The voltage/current phase angle lag is sensed by a plurality of conditional test windows. This is illustratively shown in FIG. 2. After zero crossing of the line voltage at 66, there is initiated a sequence of three fixed time delay periods or windows 94, 96, 98 and a fourth window 100. If the power factor is at the desired level, the power switch will turn off during the third window 98 as shown by zero crossing 68 of the current therein. This will not cause any change in the firing angle delay of the gate signal to the power switch during the next half-cycle, i.e., power switch 36 will again be gated ON at point 84 in the increasing line voltage. If the current zero crossing 68 occurs in any of the other windows, then the firing angle delay of the gate signal to the power switch will be changed to increase or decrease the power factor as required.

The length of the firing angle delay of the gate signal to the power switch is controlled by the contents of a memory register in the microcomputer. If the memory register is incremented, the delay in activation of pin 8 (to a LOW condition) is increased. This delays the biasing of transistor 42 into conduction, which in turn delays gating of the power switch 36 into conduction. If the memory register is decremented, the delay in activation of pin 8 is decreased, whereby the power switch 36 will be gated into conduction at an earlier time in the cycle of the source voltage.

The windows comprise a set of conditional tests. After voltage zero crossing 66 is sensed, first window 94 is initiated. This first window 94 lasts a predetermined time. At the end of first window 94, the status of power switch 36 is tested. If the power switch has already turned off, i.e., current zero crossing 68 has occurred between points 66 and 94, then the motor 34 has been subjected to a sudden load. The memory register in the microcomputer is then zeroed, i.e., its contents are erased. This substantially eliminates any delay in the firing angle of the gate signal to the power switch. The power switch is then gated into conduction immediately after window 98. This provides substantially instantaneous full power in a sudden load situation. Anytime the delay is already zero and an indication is present, the motor still needs more power, the power switch will be fired continuously for several cycles to assure max voltage to the motor.

If the status test of power switch 36 at the end of first window 94 indicates that power switch 36 has not turned off, then second window 96 is initiated. Second window 96 lasts a predetermined time. The status of the triac is tested at the end of window 96. If the power switch has turned off, i.e., current zero crossing 68 has occurred between points 94 and 96, then the power factor is too great and more power is needed at the motor. The microcomputer memory register is then decremented to decrease the firing angle delay of the gate signal to the power switch. The power switch is thus fired at earlier points in the increasing line voltage during subsequent half-cycles. This causes the power switch to be ON for longer portions of the line voltage half-cycles. This increases the power delivered to the motor.

If the status test of the power switch 36 at the end of second window 96 indicates that triac 36 has not turned off, then third window 98 is initiated. Third window 98 lasts a predetermined time. The status of the triac is tested at the end of window 98. If the triac has turned off, i.e., current zero crossing 68 has occurred between points 96 and 98, then the power factor is at a desired optimum level and the proper amount of power is being applied to the motor. The microcomputer memory register is held stable, and the firing angle delay of the gate signal to the power switch is not changed. The power switch is thus fired at the same points 84 and 82 in the next negative and positive half-cycles. This maintains optimum power factor operation of the motor by maintaining an optimum percentage of ON time of the power switch in the cycle of the line voltage.

If the status test of the power switch 36 at the end of third window 98 indicates that power switch 36 has not turned off, then fourth window 100 is initiated. Zero crossing 68 of the current will occur somewhere in the fourth window. If fourth window 100 is initiated, then the power factor is too low and too much power is getting to the motor. Initiation of the fourth window 100 increments the microcomputer memory register to increase the firing angle delay of the gate signal to the switch. The switch is thus fired at later points in the increasing line voltage during subsequent half-cycles. This causes the switch to be ON for shorter portions of the line voltage half-cycles. This decreases the power delivered to the motor.

The fourth window 100 controls a variable time delay which sets the time when the power switch is fired in the next cycle. Upon initiation of fourth window 100, the microcomputer increments a number in its memory register which is used to generate an incremented delay in the firing angle of the gate signal to the power switch. This incrementation of firing angle delay is cumulatively repeated for each successive cycle that the fourth window 100 is re-initiated. After several repetitions, for example, the status test of the power switch 36 at the end of third window 98 will again indicate that power switch 36 has turned off, whereby zero crossing 68 of the current has occurred before the end of third window 98.

If the power factor swings slightly below the desired level, i.e., too little power is getting to the motor, then the status test of the power switch at the end of second window 96 will indicate that the power switch has turned off. The firing angle delay of the gate signal to the power switch is now simply decremented slightly, thus giving more power to the motor to correct the power factor.

As noted above, the first delay window 94 is particularly advangtageous in sudden load situations. Simple decrementation of the firing angle delay may not provide fast enough response to a rapidly increasing power factor due to quickly increased motor load. When the power factor increases to the point that the power switch turns off during the first window 94, the microcomputer responds by totally zeroing any firing angle delay of the gate signal to the power switch. This enables immediate application of full power to the motor. There is thus provided effective response to instantaneous zero to maximum load transitions. Once full power is applied, the microcomputer will immediately begin incrementing the firing angle delay if full power is not needed. The fast response to sudden loads is desirable to prevent stalling or substantial slowdown of the motor which could cause overheating thereof.

Delay window times 94, 96 and 98 are scaled to a number jumpered to an input port defined by pins 2, 3, 4 and 5. Jumper 102 is connected to conductor 43. Jumper 104 is connected through resistor 106 to conductor 35. Diode 108 and resistor 110 are connected in parallel between conductor 35 and pin 24. The Vdd port at pin 18 is connected to conductor 35. The VC port at pin 17 is connected through potentiometer 112 to conductor 35. Potentiometer 112 provodes a slight adjustment of the internally generated clock rate. Resistor 110, capacitor 58 and diode 108 make up a standard network to initialize the computer when power is first applied.

The preferred system of delay windows assures stability, and provides adequate response to changing loads. This preferred system further provides instantaneous response within one cycle, of a 60 hertz source, to quickly increasing loads.

The power switch is fired in the negative half-cycle symmetrically to the positive half-cycle. It should be noted that the microcomputer does not receive a true line voltage zero crossing indication. The sensed indication of voltage crossover 66 is provided by pin 25 being pulled high through the base-emitter of transistor 70. This sensed indication of crossover from negative to positive comes when the line voltage is about 12 volts for about a 60 hertz 110 volt AC source. The time lag between actual occurrence and sense indication is about 0.2 milliseconds. A similar error occurs on the positive to negative crossover, making the total symmetry error about 0.4 milliseconds. This complicates symmetrical positive and negative half-cycle firing of the power switch. This problem is solved by adding a de-skew delay which is varied by changing a number jumpered to the input port defined by pins 20, 21, 22 and 23.

Although a preferred embodiment has been described in detail, it will be appreciated that various substitutions, alterations and additions may become apparent to those skilled in the art. These modifications may be made without departing from the scope and spirit of the invention as defined by the appended claims.

What is claimed is:

1. A power factor controller for an AC induction motor energizable by an AC power source, comprising:
   switch means having an ON state and an OFF state for selectively enabling energization of said motor by an AC power source in response to a gate signal triggering said switch means into the ON state, said AC power source being characterized by periodical voltage and current alternating waveforms;
   means for detecting zero cross-over of the voltage waveform applied to said motor;
   gate control means responsive to said voltage zero cross-over detecting means for generating a plurality of discrete time windows during which the ON/OFF status of said switch means can be detected;
   means for detecting the ON/OFF status of said switch means during each time window; and,
   means responsive to the detected ON/OFF status of said switch means during each time window for controlling the application timing of said gate signal.

2. The invention according to claim 1 wherein:
   said discrete time windows are initiated in response to said voltage zero crossing and are consecutively sequenced; and
   the application timing of said gate signal is determined by the time window
   in which said current zero crossing occurs.

3. The invention according to claim 2 said consecutively sequence time windows being characterized by:
   an early time window advancing the timing of said gate signal to trigger said switch means into conduction in the ON state earlier during one period of said voltage waveform;
   a middle time window leaving the timing of said gate signal unchanged;
   and
   a late time window retarding the timing of said gate signal to trigger said switch into conduction in the ON state later during one period of said voltage waveform.

4. The invention according to claim 2 comprising first, second and third fixed time windows and a fourth time window, said first time window is initiated by said gate control means in response to voltage zero crossing and lasts a predetermined time;

the occurrence of said current zero crossing in said first window indicates a sudden load on said motor and substantially eliminates firing angle delay in said timing of said gate signal to enable instantaneous full power to said motor;

said second window is initiated by said gate control means in response to the absence of current zero crossing in said first time window and lasts a predetermined time;

occurrence of said current zero crossing in said second window indicates the need for more power to be applied to said motor and decreases firing angle delay in said timing of said gate signal to trigger said switch means into conduction earlier in one period of said source waveform to increase the power delivered to said motor;

said third window is initiated by said gate control means in response to non-occurrence of said current zero crossing in said second time window and lasts a predetermined time;

occurrence of said current zero crossing in said third time window indicates an optimum motor power factor and does not change firing angle delay in said timing of said gate signal;

said fourth time window is initiated by said gate control means in response to non-occurrence of said current zero crossing in said third time window; and initiation of said fourth time window indicates that said motor is getting more power than necessary and increases firing angle delay in said timing of said gate signal to trigger said switch means into conduction later in one period of said source to decrease the power delivered to said motor.

5. The invention according to claim 4 wherein consecutive re-initiation of said fourth window further increases firing angle delay in said timing of said gate signal, said last mentioned increase being repetitively incremented cumulatively for each said consecutive re-initiation until said current zero crossing again occurs in said third window.

6. The invention according to claim 4 wherein consecutive re-initiation of said second window further decreases firing angle delay in said timing of said gate signal, said last mentioned increase being repetitively decremented cumulatively for each said consecutive re-initiation until said current zero crossing again occurs in said third window.

7. The invention according to claim 4 wherein:
said gate control means comprises a microcomputer having a memory register which is incremented to increase said firing angle delay, and decremented to decrease said firing angle delay;
said memory register is decremented at the end of said second window in response to occurrence of said current zero crossing in said second window; and
said memory register is incremented at the end of said third window in response to non-occurrence of said current zero crossing by termination of said third window.

8. The invention according to claim 7 wherein said memory register is repetitively incremented cumulatively upon each successive re-initiation of said fourth window until said current zero crossing again occurs prior to the end of said third window.

9. The invention according to claim 7 wherein said memory register is repetitively decremented cumulatively upon each successive re-initiation of said second window until said current zero crossing again occurs after the end of said second window.

10. The invention according to claim 7 wherein said memory register is zeroed at the end of said first window in response to occurrence of said current zero crossing in said first window.

11. A power factor controller for an AC induction motor energizable by an AC power source, comprising:
a semiconductor switch coupled in series with said motor for enabling energization of said motor by an AC power source in response to a gate signal triggering said switch into conduction;
means for sensing zero crossing of source voltage;
means for sensing zero crossing of current through said motor;
gate control means for selectively controlling the timing of said gate signal;
said gate control means generating a plurality of delay periods during which the time lag of said current zero crossing subsequent to said voltage zero crossing can be detected, each said delay period forming a time window; and
said timing of said gate signal in said cycle of said source being determined by the time window in which said current zero crossing occurs.

12. The invention according to claim 11 wherein said gate control means comprises:
a first input port connected to said voltage zero crossing sensing means;
a second input port connected to said current zero crossing sensing means; and
an output port producing a signal during the cycle of said source at a time determined by the time lag between the signal applied to said first input port and a signal applied to said second input port in accordance with the discrete window in which said second input port signal occurs, said output port signal controlling delivery of said gate signal.

13. The invention according to claim 12 further comprising adjustment means adjustably setting the length of said windows.

14. The invention according to claim 12 wherein:
said gate control means further comprises memory register means controlling the timing of said output port signal;
occurrence of said second input port signal during said early window decrementing said memory register means to produce said output port signal earlier in the cycle of said source; and
occurrence of said second input port signal during said late window incrementing said memory register means to produce said output port signal later in the cycle of said source.

15. The invention according to claim 14 wherein:
said gate control means further includes an initial window sequenced before said early window; and
occurrence of said second input port signal during said initial window zeroing said memory register means to produce a non-delayed said output port signal in the cycle of said source and provide substantially instantaneous full power to said motor in a sudden load situation.

16. A power factor controller for an AC induction motor energizable by an AC power source, comprising:
   a power switch having a gate and connected in series with said motor and enabling energization of said motor by said source in response to a gate signal applied to the power switch gate triggering said power switch into condition;
   a gate current circuit connected between said source and the gate of said power switch and including a gate switch for controlling delivery of said triggering gate signal from said source to said power switch gate;
   a microcomputer having an output port connected to said gate switch for controlling conduction thereof;
   first sensor means connected to said source in producing a signal and response to zero crossing of source voltage;
   second sensor means connected to said power switch and sensing zero crossing of current through said motor by sensing an OFF condition of said power switch producing a voltage increase there across; and
   said microcomputer having a first input port connected to said first sensor means, and a second input port connected to said second input means.

17. The invention according to claim 16 wherein said first sensor means comprises a transistor having an emitter connected to said source and a base connected to said first input port, said first input port being activated high through the base-emitter of said transistor upon initiation of the positive half-cycle of source voltage.

18. The invention according to claim 17 wherein said second sensor means comprises the collector of said transistor connected to said second input port, said base of said transistor being connected to said power switch to be driven high when said power switch turns off such that base current for said transistor is eliminated and said collector is pulled low, and wherein said second input port signal is said low state of said collector.

19. The invention according to claim 18 further comprising a diode connected between said base of said transistor and said power switch and said diode being poled such that said diode is reversed biased upon turn-off of said power switch, to insure elimination of base current for said transistor.

20. The invention according to claim 19 wherein said gate switch comprises another transistor having its base connected to said output port and one of its emitter and collector connected to said source through a second diode in common with the source connection of said first transistor.

21. A method of controlling the power factor for an AC induction motor energizable by an AC power source, said method:
   providing a semiconductor switch enabling energization of said motor by said source in response to a gate signal triggering said switch into conduction;
   sensing the voltage zero crossing of said source;
   initiating a consecutive sequence of time delayed periods forming discrete time windows;
   sensing zero crossing of current through said motor; and
   selectively controlling the timing of said gate signal in the cycle of said source according to the window of occurrence of said current zero crossing.

22. The method according to claim 21 comprising:
   initiating a first fixed delay window in response to said voltage zero crossing, and providing a non-delayed said gate signal in response to occurrence of said current zero crossing in said first window, to provide substantially instantaneous full power to said motor in a sudden load situation;
   initiating a second fixed delay window upon termination of said first window and providing said gate signal earlier in said source cycle in response to occurrence of said current zero crossing in said second window, to increase power to said motor;
   initiating a third fixed delay window upon termination of said second window and maintaining the timing of said gate signal unchanged in response to occurrence of said current zero crossing in said third window; and
   initiating a fourth delay window upon termination of said third window and providing said gate signal later in said source cycle to decrease power to said motor.

23. The method according to claim 22 further comprising repetitively cumulatively incrementing said delay in timing of said gate signal in response to each consecutive re-initiation of said fourth window until said current zero crossing occurs in said third window.

24. The method according to claim 22 further comprising repetitively cumulatively decrementing said delay in firing of said gate signal in response to each consecutive re-initiation of said second window until said current zero crossing occurs in said third window.

25. The invention according to claim 23 comprising incrementing and decrementing register means to retard and advance said gate signal timing, respectively, and for zeroing said register means to provide substantially instantaneous full power to said motor.

26. A power factor controller for an AC induction motor energized from an AC source via a gated semiconductor switch comprising:
   a voltage/current phase lag sensing circuit for determining a lag of a current phase including a voltage crossing circuit for detecting a zero crossing of line voltage and a timing circuit for detecting a zero crossing of line current and determining in which one of a plurality of specified sequential time periods the line current zero crossing occurs, the time period defining a magnitude of current phase lag; and
   a gate control circuit for determining the length of the firing angle delay of the gate signal to the semiconductor switch in response to a value stored in a memory circuit, said value being altered by said gate control circuit in response to the magnitude of the current phase lag.

27. The invention according to claim 26 wherein said specified sequential time periods include a first time period during which the line current zero crossing occurrence represents a sudden application of load requiring a minimal firing angle delay in order to apply full power to the motor and said gate control circuit in response to the zero crossing of the current in the first time period zeroing the value stored in the memory circuit.

28. The invention according to claim 27 wherein said plurality of specified sequential time periods includes a second time period during which the occurrence of the zero crossing of current indicates the need for more power and said gate control circuit in response to the zero crossing of the current in said second time period incrementally decreasing the value stored in the memory circuit.

29. The invention according to claim 28 wherein said plurality of time periods includes a third time period during which the occurrence of the current zero crossing indicates an optimum motor power factor and said gate control circuit does not alter the value stored in the memory circuit.

30. The invention according to claim 29 wherein said plurality of specified sequential time periods includes a fourth time period during which the current zero crossing indicates that said motor is getting more power than necessary and the gate control circuit in response thereto incrementally increases the value stored in the memory circuit.

31. The invention according to claim 30 wherein consecutive occurrences of the current zero crossing in said second time period further decreases firing angle delay in said gate control circuit until said zero crossing occurs in said third time period.

32. The invention according to claim 30 wherein consecutive occurrences of the current zero crossing in said fourth time period further increases firing angle delay in said gate control circuit until said current zero crossing occurs in said third time period.

33. The invention according to claim 32 wherein said gate control circuit includes a microcomputer including a memory register as said memory circuit, said memory register incremented to increase said firing angle delay, and oppositely decremented to decrease said firing angle delay in response to the magnitude of the current phase lag.

34. The invention according to claim 33 wherein said occurrence of the current zero crossing in said first time period initializes said memory register or otherwise modifies the register so that the firing angle delay will be eliminated.

35. The invention according to claim 34 wherein said memory register is decremented at the end of the second time period in response to the occurrence of said current zero crossing in said second time period or said memory register is incremented at the end of said third time period in response to nonoccurrence of said current zero crossing.

36. The invention according to claim 26 wherein said time periods include at least three sequentially discrete time periods including:
an early time period decreasing the firing angle delay in said gate control circuitry to cause the switch to conduct earlier in said cycle;
a middle time period leaving the firing angle delay of said gate control circuit unchanged; and
a late time period increasing the firing angle delay to cause conduction later in said cycle.

37. The invention according to claim 35 wherein said memory register is repetively incremented cumulatively upon each successive occurrence of the current zero crossing in said fourth time period until said current zero crossing again occurs prior to the end of said third time period.

38. The invention according to claim 35 wherein said memory register is repetitively decremented cumulative upon each successive occurrence of said current zero crossing in said second time period until said current zero crossing again occurs at the end of said second time period.

39. The invention according to claim 35 wherein said memory register is zeroed at the end of said first time period in response to the occurrence of said current zero crossing in said first time period.

40. A method for controlling the power factor for an AC induction motor energized by an AC source via a gated semiconductor switch, said method comprising the steps of:
sensing a voltage zero crossing of said AC source;
sensing a zero crossing of the line current;
determining in which one of a plurality of specified sequential time periods that are initialized upon the occurrence of said line voltage zero crossing that the line current zero crossing occurs, the time period defining a magnitude of current phase lag; and
selectively controlling the firing angle delay in response to the magnitude of the current phase lag.

41. A method according to claim 40, further comprising the steps of initiating a first time period in response to the voltage zero crossing and providing a nondelayed signal to said gated semiconductor switch in response to the occurrence of the current zero crossing in the first time period to provide substantially instantaneous full power to the motor in a sudden load situation;
initiating a second time period upon termination of said first time period in providing said signal to said gated semiconductor switch earlier in the source cycle in response to the occurrence of the current zero crossing in the second time period, to increase power to the motor;
initiating a third time period upon termination of the second time period and maintaining the firing angle delay unchanged in response to occurrence of the current zero crossing in the third time period; and
initiating a fourth time period upon termination of said third time period and providing said gate signal late in the source cycle to decrease power to said motor.

42. The method according to claim 41 further comprising repetitively and cumulatively increasing said firing angle delay of said gate control circuit in response to the consecutive currents of said current zero crossing in said fourth time period until said current zero crossing occurs in said third time period.

43. The method according to claim 41 further comprising repetitively and accumulatively decreasing said firing angle delay of said gate control circuit in response to each consecutive occurrence of the current zero crossing in the second time period until said current zero crossing occurs in said third time period.

* * * * *